United States Patent [19]
Crain

[11] 4,084,184
[45] Apr. 11, 1978

[54] TV OBJECT LOCATOR AND IMAGE IDENTIFIER

[76] Inventor: David W. Crain, 10978 Vivaracho Way, San Diego, Calif. 92124

[21] Appl. No.: 708,506

[22] Filed: Jul. 26, 1976

[51] Int. Cl.² .................. H04N 5/18; H04N 7/18
[52] U.S. Cl. ................................ 358/93; 358/108
[58] Field of Search .............. 358/125, 93, 108, 140, 358/103; 250/203 CT; 356/141, 152; 343/5.5 C

[56] References Cited

U.S. PATENT DOCUMENTS

| | | | |
|---|---|---|---|
| 3,859,460 | 1/1975 | Westell | 358/125 |
| 3,903,361 | 9/1975 | Alpers | 358/125 |
| 3,904,817 | 9/1975 | Hoffman et al. | 358/140 |
| 4,002,827 | 1/1977 | Nevin et al. | 358/140 X |

*Primary Examiner*—Robert L. Griffin
*Assistant Examiner*—Aristotelis M. Psitos
*Attorney, Agent, or Firm*—Richard S. Sciascia; Ervin F. Johnston; John Stan

[57] ABSTRACT

A television object locator and image identifier, for use with a TV camera tube, having a lens whose axis is determined by the angles $\theta_c$ and $\phi_c$. The angle $\theta_c$ forms a dihedral angle between two vertical planes, one of which contains the axis of the lens. The angle $\phi_c$ is formed by the vertical edge of the dihedral angle and the lens axis. The coordinates of the center of the lens are located at $(x_c, y_c, z_c)$, at the intersection of the edge and the lens axis, these coordinates also being those of the origin of the locator for a fixed camera position. Means are provided for determining the aperture angle $\Omega_c$ of the TV lens, as well as means for determining the angles $\theta_c$ and $\phi_c$. Means are also provided for determining the coordinates $(x_o, y_o, z_o)$ of the object which is to be identified with respect to the origin. First and second means for transforming coordinates, have as inputs signals representing the angle $\Omega_c$ and the coordinates $(x_c, y_c, z_c)$, and $(x_o, y_o, z_o)$, and have as an output a signal representing the pair of coordinates $(x_T, y_T)$, which are scaled proportionally to the dimensions of the location of the image in the total field of view. Means are provided for computing the precise location on the TV raster of the object to be identified, in the horizontal and vertical directions.

9 Claims, 4 Drawing Figures

APPARATUS FOR THE GENERATION OF AN IMAGE IDENTIFIER FOR A TV TUBE.

COORDINATE SYSTEMS FOR TV LENS AND OBJECT TO BE LOCATED.

COORDINATE SYSTEMS OF FIG. 1 WITH AXES OF BOTH SYSTEMS MADE TO COINCIDE.

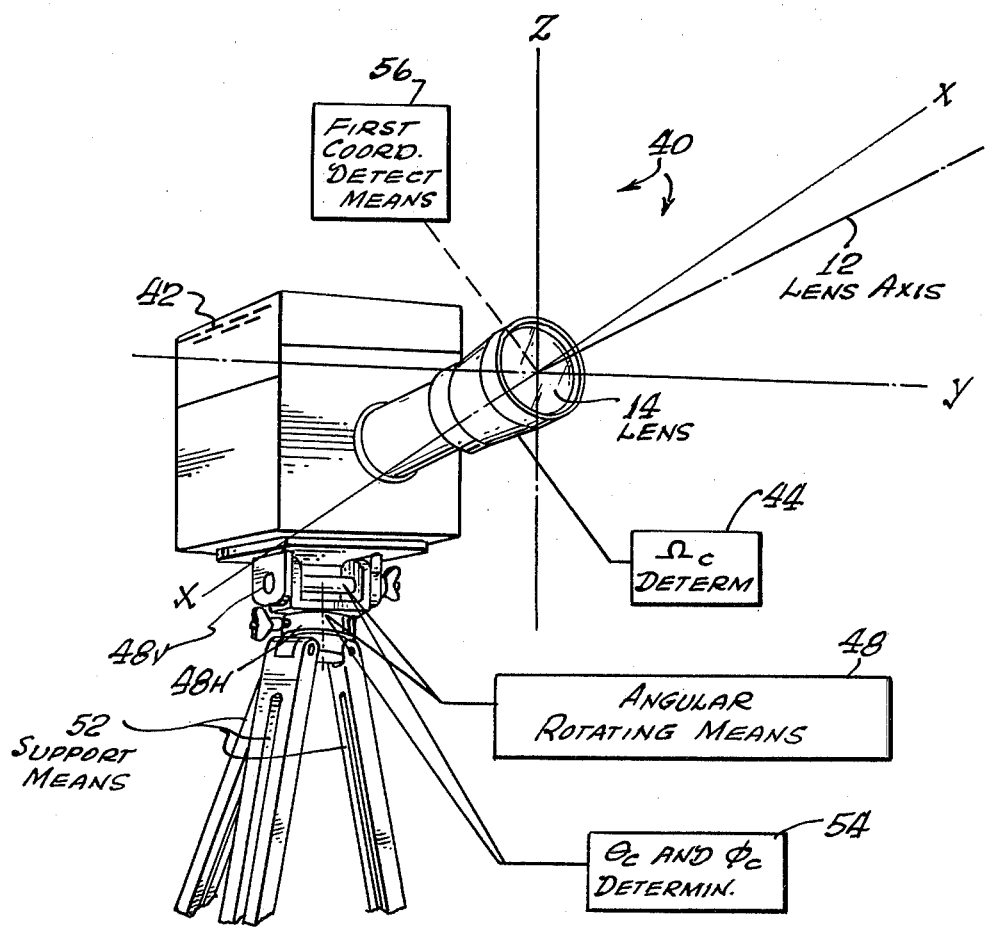
Fig. 3. TV Camera and its Controls.
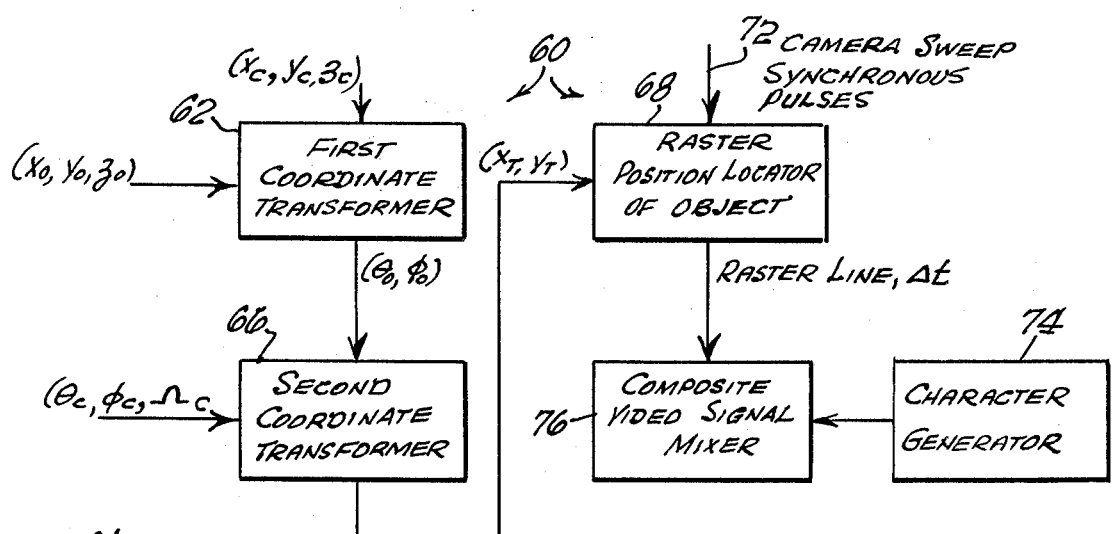
Fig. 4. Apparatus for the generation of an image identifier for a TV tube.

TV OBJECT LOCATOR AND IMAGE IDENTIFIER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to apparatus which can be used to identify the location of objects in the field of view during real time, i.e. live, television presentations. This would be useful in surveillance and exploration vehicles that use television systems to visually locate objects whose positions are known (e.g. via acoustical sonar inputs). The apparatus would also be useful in real-time commercial television broadcasts such as sporting events, e.g. in a football game, the identification of the line of scrimmage and first down line during the course of actual play, and news events coverage, e.g. during a rocket lift-off, the identification of the position of the rocket as it becomes obscured by clouds.

Related techniques present alphanumeric data superimposed on an unused portion of the television picture, e.g. the time of day, baseball batting averages, etc. For televising sporting events, sometimes a full view of the participant is shown in the main part of the TV screen, with a corner of the screen showing only the head, to show the facial expressions in more detail.

The invention disclosed herein represents a unique combination of data sensing instruments, yielding optical and geometrical information, to provide a substantially more informative display than those of prior art television systems. The presentation of markers and characters that are an integral part of the real-time television picture has not heretofore been done. Data displays resultant from present techniques differ from the invention disclosed herewith in that such data is not directly identifiable with objects in the field of view, e.g. it does not remain attached to objects when the television camera changes its field of view.

SUMMARY OF THE INVENTION

This invention relates to a television object locator and image identifier, for use with a TV camera tube. The axis of the lens is determined by the angles $\theta_c$ and $\phi_c$, $\theta_c$ forming the dihedral angle between two vertical planes, one of which contains the axis of the lens, the angle $\phi_c$ being formed by the vertical edge of the dihedral angle and the axis. The coordinates of the center of the lens are located at $(x_c, y_c, z_c)$, at the intersection of the edge and the lens axis.

Means are connected to the TV tube, for determining the aperture angle $\Omega_c$ of the TV lens; and another means is provided for determining the angles $\theta_c$ and $\phi_c$.

Means are also provided for determining the coordinates $(x_c, y_c, z_c)$, with respect to a geographical center, or origin. (0, 0, 0).

A first means for transforming coordinates, has as inputs signals representing the coordinates $(x_o, y_o, z_o)$ and $(x_c, y_c, z_c)$, and has as an output a signal representing the coordinates $(\theta_o, \phi_o)$, whose system origin is centered on the point $(x_c, y_c, z_c)$.

A second means for transforming coordinates, has as inputs signals representing the coordinates $(\theta_c, \phi_c, \Omega_c)$ and $(\theta_o, \phi_o)$, and as an output a signal representing the pair of coordinates $(x_T, y_T)$, lying in a plane whose origin is on the TV lens axis and which is normal to the TV lens axis.

Means are provided for computing the precise location on the TV raster of the object to be identified, in the horizontal and vertical directions. The input signals to the means comprise the scaled values $(x_T, y_T)$ from the second coordinate transformer, and the TV camera sweep synchronous pulses. The output signal comprises information with respect to the specific raster line $r$ on which the object to be identified is located and $\Delta t$, the time delay with respect to the beginning of the TV horizontal deflection, so that the image is precisely located on the TV raster.

The TV object locator may further comprise means for generating a TV marker, which generates a visible TV pattern identifying the object, and a composite video signal mixer, whose inputs are connected to the outputs of the computing means and of the marker generating means, the output of the mixer comprising a composite video signal which includes information which identifies the object on the display.

The TV object locator may further comprise the TV camera tube, which may be a vidicon.

STATEMENT OF THE OBJECTS OF THE INVENTION

An object of the invention is to provide an object locator and image identifier which can be positioned at any desired point or area of a TV raster.

Another object of the invention is to provide a locator and identifier which remains in the correct relative position on the raster even if the camera is panned to other directions.

These and other objects of the invention will become more readily apparent from the ensuing specification taken together with the drawings.

BRIEF DESCRIPTION OF THE DRAWINGS

FIG. 3 is a partially diagrammatic, partially block diagram, view of a TV camera and controls for it according to the invention.

FIG. 4 is a block diagram showing the apparatus of this invention for the generation of an image identifier for a TV camera tube.

DESCRIPTION OF THE PREFERRED EMBODIMENTS

Figure 1:
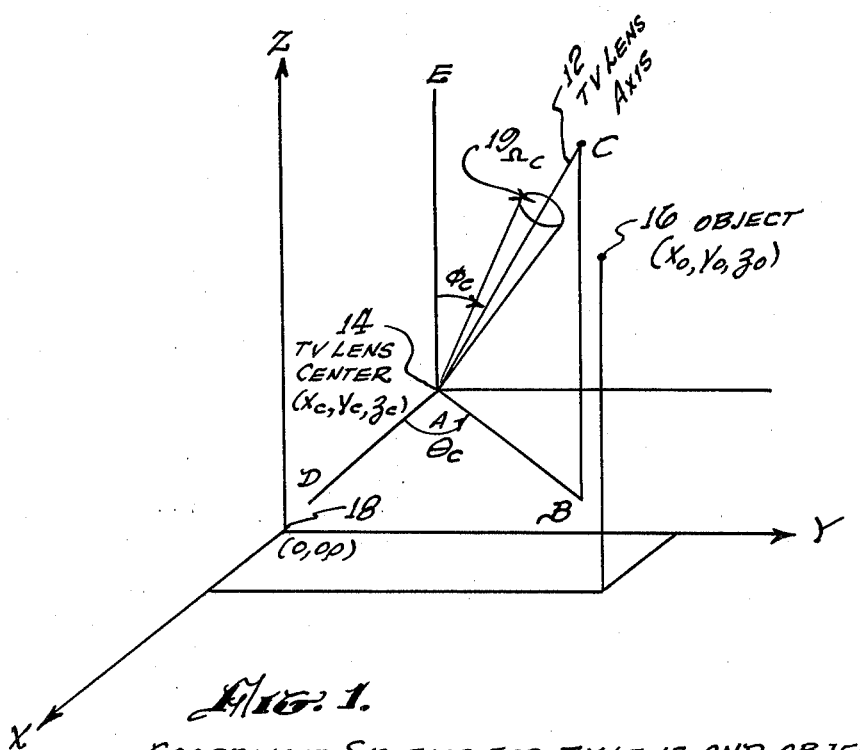
FIG. 1 is a diagram comprising two coordinate systems, one for the TV lens and the other for the object to be located.

Referring now to FIG. 1, therein is shown a coordinate system 10 for use with a television object locator and image identifier, used with a TV camera tube, having a variable-aperture lens. The axis 12 is determined by the angles $\theta_c$ and $\phi_c$. The angle $\theta_c$ forms a dihedral angle between two vertical planes, ABC and ADE, one of which contains the axis 12 of the lens. The angle $\phi_c$ is formed by the vertical edge AE of the dihedral angle BAD and the axis AC, or 12, the coordinates of the center 14 of the lens being at $(x_c, y_c, z_c)$, at the intersection of the edge AE and the lens axis 12.

The coordinates $(x_o, y_o, z_o)$, shown by reference numeral 16, of the object which is to be identified, with respect to the origin must be known in advance.

The coordinates $(x_c, y_c, z_c)$ may be defined with respect to a geographical center, or origin, (0, 0, 0), 18, of an XYZ coordinate system, as are the coordinates $(x_o, y_o, z_o)$, 16, of the object which is to be identified.

Figure 2:
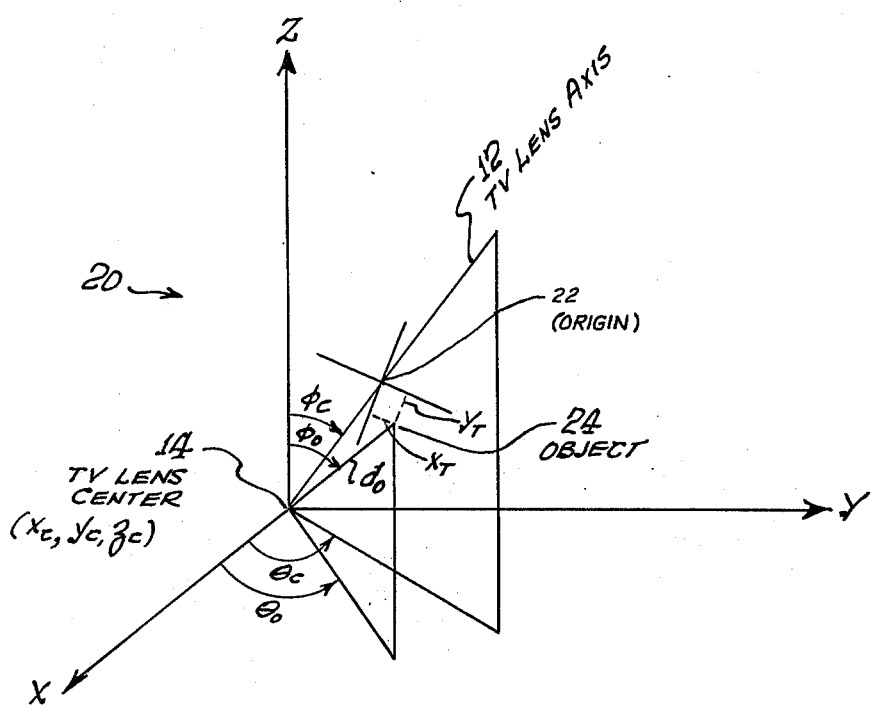
FIG. 2 is a diagram showing the resultant coordinate system after one of the coordinate systems of FIG. 1 is translated so that both coordinate systems coincide.

In FIG. 2 the origins of the coordinate systems 10 of FIG. 1, with respect to the coordinates of the object $(x_o, y_o, z_o)$ and of the TV lens axis 12 are made to coincide, so as to result in one coordinate system XYZ, shown as 20.

Referring now to FIG. 3, therein is shown an embodiment 40 of a TV camera 42 and its controls for use with a television object locator and image identifier.

The variable-aperture lens 14, whose axis 12 is determined by the angles $\theta_c$ and $\theta_c$, not shown in this figure, has its center at the coordinates $(x_c, y_c, z_c)$, at the intersection of the edge AE of the dihedral angle DAEB and the lens axis 12.

Means 44 are connected to the TV tube, for determining the aperture angle $\Omega_c$ (19 of FIG. 1), of the TV lens 14. The term "aperture", as defined herein, denotes the angular field of view $\Omega_c$ of the camera lens system, and is not to be confused with the term "aperture stop". The field stop of the lens system, fixed by aperture plates and the lens focal length, is the mechanically adjustable parameter that determines the extend of the object, or the field, represented in the image, and is a function of the camera aperture angle $\Omega_c$, that is, the angular field of view, as used herein. The means 44 may comprise, for example, a potentiometer connected to aperture gearing means, in a manner so as to rotate with it.

Angular rotating means 48, connected between the base of the camera 42 and a support means 52, rotates the camera about a vertical or horizontal axis.

Means 54 are connected to the angular rotation means, 48 for determining the angles $\theta_c$ and $\theta_c$. The angle $\theta_c$ may be determined by a gyro compass, for example, and the angle $\theta_c$ may be determined by an inclinometer.

Means 56 are provided for determining the coordinates $(x_c, y_c, z_c)$, with respect to the geographical center, or origin, (0, 0, 0). The means may comprise inertial navigation instrumentation. For a fixed camera position, $(x_c, y_c, z_c) = (0, 0, 0)$, and the inertial navigator is not needed.

The coordinates $(x_o, y_o, z_o)$ of the object which is to be identified with respect to the origin, must be known a priori, for example, by using surveying instruments, or by navigational identification of the latitude and longitude. In the absence of an a priori determination of the coordinates $(x_o, y_o, z_o)$, a reverse transformation may be used to derive $(x_T, y_T)$. This may be done once the object appears on the TV display with a light emitting cursor. The position of the cursor in terms of raster line and horizontal deflection would be used to derive the coordinates $(x_T, y_T)$.

Referring now to FIG. 4, therein is shown a generalized embodiment of an apparatus 60 for the generation of an image identifier for a TV tube. It comprises a first means 62 for transforming coordinates, having as inputs signals representing the coordinates $(x_o, y_o, z_o)$ and $(x_c, y_c, z_c)$, and having as an output a signal representing the coordinates $(\theta_o, \phi_o)$. The origin of the system is the point $(x_c, y_c, z_c)$.

The equations for the transformation are as follows:

$$\theta_o = \tan^{-1}\left(\frac{y_o - y_c}{x_o - x_c}\right) \quad (1)$$

$$\phi_o = \cos^{-1}\left(\frac{z_o - z_c}{(x_o - x_c)^2 + (y_o - y_c)^2 + (z_o - z_c)^2}\right) \quad (2)$$

A second means 66 for transforming coordinates transforms input signals representing the coordinates $(\theta_c, \phi_c, \Omega_c)$ and $(\theta_o, \phi_o)$ into an output signal representing the pair of coordinates $(x_T, y_T)$, lying in a plane whose origin 22 (FIG. 2) is on the TV lens axis 12 and which is normal to the TV lens axis.

The equations for the scaled coordinates are:

$$x_T = \frac{\sin(\theta_c - \theta_o)}{\sin \Omega_c} \quad (3)$$

$$y_T = \frac{\sin(\phi_c - \phi_o)}{\sin \Omega_c}, \quad (4)$$

where  $x_T = \pm 1$ corresponds to full deflection of TV horizontal sweep, and  (5)

$y_T = \pm 1$ corresponds to the full vertical deflection of the TV raster.  (6)

Means 68 are provided for computing the precise location on the TV raster of the object to be identified, in the horizontal and vertical directions. The input signals to the means 68 comprise the values $(x_T, y_T)$ from the second coordinate transformer 66, and the TV camera sweep synchronous pulses 72. The output signal comprises information with respect to the specific raster line, $r$, on which the object to be identified is located and $\Delta t$, the time delay with respect to the beginning of a line of the TV horizontal deflection, so that the image is precisely located on the TV raster.

The pertinent equations are:

$$\Delta t = (x_T + 1/2) \Delta T, \quad (7)$$

where $\Delta T$ is the duration of time for one horizontal sweep, and $$r = (y_T + 1/2) R \quad (8)$$

Here R is the total number of raster lines for the display (e.g. a 230-line raster).

In the situation where the coordinates $(x_T, y_T)$ must be computed from the TV display (e.g. via the light emitting cursor), the transformation represented by equations (7) and (8) is reversed. The cursor position given by $\Delta t$ and $r$ are used as inputs with $x_T$ and $y_T$ the outputs.

That is, equations (7) and (8) may be solved for $x_T$ and $y_T$, in terms of $\Delta t$ and $\Delta T$ for the former, and in terms of $r$ and R for the latter. The following equations result:

$$x_T = (2\Delta t/\Delta T) - 1 \quad (7a)$$

$$y_T = (2R/r) - 1 \quad (8a)$$

The coordinates $(\Delta t, r)$ are known from the cursor generator. The cursor generator has the capability of generating a cursor at any predetermined spot on a raster. Once a spot has been picked, its parameters are known.

The coordinates $(x_T, y_T)$ of the object may be stored in a memory, so that a cursor may be regenerated when needed, even if the cursor is not shown in the real-time TV viewing. Then, should it be desired to show the cursor during the replay, it may be shown.

One way of accomplishing this would be to suppress the cursor for the transmitted signal, but to not suppress it for the monitoring system.

The apparatus 60 would generally further comprise means 74 for generating a TV marker, or cursor, which produces a visible TV pattern identifying the object. A composite video signal mixer 76 has its inputs connected to the outputs of the computing means 68 and of the marker generating means 74. The output of the mixer comprises a composite video signal which includes video information with respect to the object to be identified.

For images with linear and spatial extent, locations that define the boundaries of the object (i.e. end points of a line for linear objects, corners for spatial objects) must be determined in the same manner that point object images are determined (i.e. by surveying or navigational information or by a light-emitting cursor).

This data defines a set of scaled $(x_T, y_T)$ through the computer transformation. The computer can then generate sets of $(x'_T, y'_T)$ which connect the original $(x_T, y_T)$ sets with a series of points (raster line dots) which give the appearance of a line superimposed on the boundaries of the image.

A somewhat cruder method of achieving the same result would be to begin with a series of $(x_o, y_o, z_o)$ object coordinates which lie along the object boundary with a density sufficient to give the appearance of a line when the corresponding sets $(x_T, y_T)$ are displayed.

Accordingly, the TV object locator may further comprise means for computing the values of $(x_T, y_T)$ for the end points of a linear cursor, and for any points in between for situations where the object to be located is of an oblong shape.

It may also comprise means for computing the values of $(x_T, y_T)$ for the profile of a planar cursor, and any points within the profile.

The TV object locator may comprise the TV camera tube itself, which may be a vidicon.

In another type of embodiment, the first, second and third means for transforming coordinates and the means for computing may comprise a special-purpose computer. This computer may also have a memory for storage of input data such as the coordinates $(x_o, y_o, z_o)$, as well as computed data, such as the coordinates $(x_T, y_T)$.

Alternate geometrical and angle data sensors to those described hereinabove can be used. The only requirement is that such sensors transform mechanical coordinate and angle data to electrical signals. Alternate coordinate systems can be used with attendant changes in the transformation equations and computational procedures. The description already given is sufficiently general to account for such alternatives, while, at the same time, it shows the sufficient data inputs required and computational steps needed to make a working embodiment.

Obviously, many modifications and variations of the present invention are possible in the light of the above teachings, and, it is therefore understood that within the scope of the disclosed inventive concept, the invention may be practiced otherwise than specifically described.

What is claimed is:

1. A television object locator and image identifier, having a lens whose axis is determined by the angles $\theta_c$ and $\phi_c$, the angle $\theta_c$ forming a dihedral angle between two vertical planes, one of which contains the axis of the lens, the other plane being parallel to the XZ plane of an XYZ coordinate system, the angle $\phi_c$ being formed by the vertical edge of the dihedral angle and the axis of the lens, the coordinates of the center of the lens being at $(x_c, y_c, z_c)$, at the intersection of the edge and the lens axis, and wherein the coordinates $(x_o, y_o, z_o)$ of the object which is to be identified with respect to the origin $(0, 0, 0)$ of the XYZ system is known, comprising:

a TV tube;

means, connected to the TV tube, for determining the aperture angle $\Omega_c$ of the TV lens;

means for determining the angles $\theta_c$ and $\phi_c$;

means for determining the coordinates $(x_c, y_c, z_c)$, with respect to the origin, $(0, 0, 0)$;

a first means for transforming coordinates, having as inputs signals representing the coordinates $(x_c, y_c, z_c)$ and $(x_o, y_o, z_o)$, and having as an output a signal representing the coordinates $(\theta_o, \phi_o)$, whose system origin is centered on the point $(x_c, y_c, z_c)$;

a second means for transforming coordinates, whose inputs are signals representing the coordinates, $(\theta_c, \phi_c, \Omega_c)$ and $(\theta_o, \phi_o)$ and whose output is a signal representing the pair of coordinates $(x_T, y_T)$, lying in a plane whose origin is on the TV lens axis and which is normal to the TV lens axis; and means for computing the precise location on the TV raster of the object to be identified, in the horizontal and vertical directions, the input signals to the means comprising the values $(x_T, y_T)$ from the second coordinate transformer and the TV camera sweep synchronous pulses, the output signal comprising information with respect to the specific raster line $r$ on which the object to be identified is located and $\Delta t$, the time delay with respect to the beginning of the TV horizontal deflection, so that the image is precisely located on the TV raster.

2. The TV object locator according to claim 1, wherein the means for determining the aperture angle $\Omega_c$ comprises:

aperture gearing means, connected to the TV lens, for controlling the aperture angle $\Omega_c$ of the TV lens;

a potentiometer connected to the aperture gearing means, for determining the aperture angle;

the means for determining the angle $\phi_c$ comprises an inclinometer;

the means for determining the angle $\theta_c$ comprises a gyro compass;

the means for determining the coordinates $(x_c, y_c, z_c)$ comprises an inertial navigation system; and wherein the means for determining the coordinates $(x_o, y_o, z_o)$ are surveying instruments.

3. The TV object locator according to claim 1, further comprising:

means for generating a TV marker, which generates a visible TV pattern identifying the object; and a composite video signal mixer, whose inputs are connected to the outputs of the computing means and of the marker generating means, the output of the mixer comprising a composite video signal which includes information which identifies the object on the display.

4. The TV object locator according to claim 3, further comprising:
the TV camera tube.

5. The TV object locator according to claim 4, wherein
the TV camera tube is a vidicon.

6. The TV object locator according to claim 5, wherein:
the first and second means for transforming coordinates and the means for computing comprise a special-purpose computer.

7. The TV object locator according to claim 6, further comprising:
means for computing the values of $(x_T, y_T)$ for the end points of a linear cursor, and for any points in between, for situations where the object to be located is of an oblong shape.

8. The TV object locator according to claim 7, further comprising:
means for computing the values of $(x_T, y_T)$ for the profile of a planar cursor, and any points within the profile.

9. A system for use with a TV camera having a lens defining an axis and a center, for identifying and locating on the screen of the tube of the camera an object located in the field of view observed by the camera, even if the camera is panned in various directions so as to cause the identified object to appear at different parts of the raster, comprising:
means for determining the precise location of the object to be identified with respect to the center and axis of the lens, the axis defining the center, in both horizontal and vertical directions, of the TV raster generated by the TV camera;
means, connected to the camera, for determining the aperture angle $\Omega_c$ of the lens; and
means for computing the precise location on the TV raster of the object to be identified, in the horizontal and vertical directions, the input signals to the means comprising the values $(x_T, y_T)$ and the TV camera sweep synchronous pulses, the output signal comprising information with respect to the specific raster line $r$ on which the object to be identified is located and $\Delta t$, the time delay with respect to the beginning of the TV horizontal deflection, so that the image is precisely located on the TV raster.

* * * * *